(12) United States Patent
Li et al.

(10) Patent No.: US 10,495,911 B2
(45) Date of Patent: Dec. 3, 2019

(54) LIQUID CRYSTAL DISPLAY ASSEMBLY AND ELECTRONIC DEVICE

(71) Applicant: XIAOMI INC., Beijing (CN)

(72) Inventors: Guosheng Li, Beijing (CN); Anyu Liu, Beijing (CN); Dongdong Yang, Beijing (CN)

(73) Assignee: XIAOMI INC., Beijing (CN)

( * ) Notice: Subject to any disclaimer, the term of this patent is extended or adjusted under 35 U.S.C. 154(b) by 135 days.

(21) Appl. No.: 15/270,218

(22) Filed: Sep. 20, 2016

(65) Prior Publication Data

US 2017/0102571 A1    Apr. 13, 2017

(30) Foreign Application Priority Data

Oct. 9, 2015  (CN) .......................... 2015 1 0649757

(51) Int. Cl.
*G02F 1/1333* (2006.01)
*G02F 1/133* (2006.01)
(Continued)

(52) U.S. Cl.
CPC ........ *G02F 1/13338* (2013.01); *G02F 1/1368* (2013.01); *G02F 1/13318* (2013.01);
(Continued)

(58) Field of Classification Search
CPC ........... G02F 1/13338; G02F 1/133528; G02F 1/136209; G02F 1/1368; G02F 1/136286;
(Continued)

(56) References Cited

U.S. PATENT DOCUMENTS 7,619,194 B2   11/2009  Kobashi
8,517,564 B2    8/2013  Kim et al.
(Continued)

FOREIGN PATENT DOCUMENTS

CN   101187752 A   5/2008
CN   101256294 A   9/2008
(Continued)

OTHER PUBLICATIONS

Extended European Search Report issued in corresponding EP Application No. EP16189059, dated Mar. 8, 2017, 9 pages.
(Continued)

*Primary Examiner* — Charles S Chang
(74) *Attorney, Agent, or Firm* — Arch & Lake LLP (57) ABSTRACT

A liquid crystal display (LCD) assembly and an electronic device are provided. The LCD assembly includes: a touch screen, an upper substrate disposed parallel to the touch screen, a lower substrate disposed parallel to the upper substrate, a liquid crystal layer enclosed between the upper substrate and the lower substrate, an upper polarizer attached to a side of the upper substrate not adjacent to the liquid crystal layer, and a lower polarizer attached to a side of the lower substrate not adjacent to the liquid crystal layer. At least one fingerprint identification sensor is disposed between the upper polarizer and the lower polarizer, and each of the fingerprint identification sensors is electrically connected to the control chip. At least one light sensor is disposed between the upper polarizer and the lower polarizer, and each of the least one light sensor is electrically connected to the control chip.

18 Claims, 7 Drawing Sheets

(51) Int. Cl.
*G02F 1/1335* (2006.01)
*G02F 1/1362* (2006.01)
*G02F 1/1368* (2006.01)
*G06F 3/041* (2006.01)
*G06K 9/00* (2006.01)

(52) U.S. Cl.
CPC .. *G02F 1/133514* (2013.01); *G02F 1/133528* (2013.01); *G02F 1/136209* (2013.01); *G02F 1/136277* (2013.01); *G02F 1/136286* (2013.01); *G06F 3/041* (2013.01); *G02F 2001/133302* (2013.01); *G06K 9/0002* (2013.01)

(58) Field of Classification Search
CPC ............ G02F 1/136277; G06K 9/0002; G06K 3/041; G06F 2001/133302
USPC .......................................................... 349/42
See application file for complete search history.

(56) References Cited

U.S. PATENT DOCUMENTS

| | | | |
|---|---|---|---|
| 8,659,576 B2 | 2/2014 | Kang et al. | |
| 2004/0130335 A1 | 7/2004 | Shimizu et al. | |
| 2007/0131936 A1* | 6/2007 | Kang | G02F 1/1354 257/72 |
| 2007/0216637 A1 | 9/2007 | Ito | |
| 2008/0122804 A1* | 5/2008 | Kinoshita | G06F 1/3203 345/175 |
| 2008/0203279 A1 | 8/2008 | Kobashi | |
| 2010/0103130 A1 | 4/2010 | Kang et al. | |
| 2012/0099304 A1 | 4/2012 | Kim et al. | |
| 2014/0132578 A1 | 5/2014 | Zheng | |
| 2016/0042216 A1 | 2/2016 | Yang et al. | |
| 2016/0299629 A1* | 10/2016 | Doyle | G06F 3/0418 |
| 2017/0091506 A1* | 3/2017 | Sinha | G06F 1/1643 |
| 2017/0147850 A1* | 5/2017 | Liu | G06K 9/0002 |

FOREIGN PATENT DOCUMENTS

| | | |
|---|---|---|
| CN | 101726897 A | 6/2010 |
| CN | 101825815 A | 9/2010 |
| CN | 101911159 A | 12/2010 |
| CN | 102454905 A | 5/2012 |
| CN | 203643985 U | 6/2014 |
| CN | 104155785 A | 11/2014 |
| CN | 104850292 A | 8/2015 |
| CN | 104881196 A | 9/2015 |
| EP | 2728512 A2 | 5/2014 |
| JP | 2004109066 A | 4/2004 |
| JP | 200692428 | 4/2006 |
| JP | 2008009616 A | 1/2008 |
| JP | 20108770 A | 1/2010 |
| JP | 2011096123 A | 5/2011 |
| JP | 20142513 | 1/2014 |
| JP | 201493774 | 5/2014 |
| WO | 2012032745 A1 | 3/2012 |
| WO | 2015111158 A1 | 7/2015 |

OTHER PUBLICATIONS

Office Action (including English language translation) issued in corresponding Japanese Application No. 2016-559641 dated Nov. 7, 2017, 6 pages.
International Search Report issued in PCT Application No. PCT/CN2016/082698, dated Jul. 29, 2016, 13 pages.
English Translation of International Search Report issued in corresponding International Application No. PCT/CN2016/082698, dated Jul. 29, 2016, 2 pages.
Office Action issued in corresponding Russian Application No. 2016140808, dated Mar. 28, 2018, 6 pages.
International Preliminary Report on Patentability issued for International Application No. PCT/CN2016/082698, dated Apr. 10, 2018, 1 page.
Japanese Office Action (including English translation) issued in corresponding Japanese Application No. 2016-559641, dated Aug. 7, 2018, 6 pages.
Chinese Office Action issued in corresponding CN Application No. 201510649757.8 dated Jan. 30, 2019, 10 pages.

* cited by examiner

LIQUID CRYSTAL DISPLAY ASSEMBLY AND ELECTRONIC DEVICE

CROSS-REFERENCE TO RELATED APPLICATION

This application is based on and claims priority of Chinese Patent Application No. 201510649757.8, filed on Oct. 9, 2015, which is incorporated herein by reference in its entirety.

TECHNICAL FIELD

The present disclosure is related to the field of display technology, and more particularly, to a liquid crystal display (LCD) assembly and electronic device.

BACKGROUND

Fingerprint identification sensors configured in an electronic device can identify a fingerprint of a user and verify the fingerprint of the user. After the verification is passed, the user is allowed to operate the electronic device, thereby preventing the electronic device from being operated by a stranger and thus ensuring security of the electronic device.

In the related arts, a liquid crystal display (LCD) assembly of an electronic device has fingerprint identification sensors evenly distributed thereon. When an operation signal acting on the LCD assembly is received, a row-by-row scanning begins from a first row of the fingerprint identification sensors in the LCD assembly and ends after the last row of the fingerprint identification sensors in the LCD assembly complete scanning, thereby obtaining the fingerprint of the user.

SUMMARY

According to a first aspect of embodiments of the present disclosure, there is provided a liquid crystal display (LCD) assembly. The LCD assembly includes: a touch screen, an upper substrate disposed parallel to the touch screen, a lower substrate disposed parallel to the upper substrate, a liquid crystal layer enclosed between the upper substrate and the lower substrate, an upper polarizer attached to a side of the upper substrate not adjacent to the liquid crystal layer and a lower polarizer attached to a side of the lower substrate not adjacent to the liquid crystal layer. The LCD assembly further includes: at least one fingerprint identification sensor, at least one light sensor and a control chip. The at least one fingerprint identification sensor is disposed between the upper polarizer and the lower polarizer, and each of the at least one fingerprint identification sensor is electrically connected to the control chip. The at least one light sensor is disposed between the upper polarizer and the lower polarizer, and each of the at least one light sensor is electrically connected to the control chip.

According to a second aspect of the embodiments of the present disclosure, there is provided an electronic device, including the liquid crystal display (LCD) assembly according to any of the first aspect.

According to a third aspect of embodiments of the present disclosure, there is provided a liquid crystal display (LCD) assembly. The LCD assembly includes: a touch screen, an upper substrate disposed parallel to the touch screen, a lower substrate disposed parallel to the upper substrate, a liquid crystal layer enclosed between the upper substrate and the lower substrate, an upper polarizer attached to a side of the upper substrate not adjacent to the liquid crystal layer and a lower polarizer attached to a side of the lower substrate not adjacent to the liquid crystal layer. The LCD assembly further includes: at least one fingerprint identification sensor, at least one light sensor and a control chip. The at least one fingerprint identification sensor is disposed between the upper polarizer and the lower polarizer, and each of the at least one fingerprint identification sensor is electrically connected to the control chip. The at least one light sensor is disposed on the touch screen, and each of the at least one light sensor is electrically connected to the control chip.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
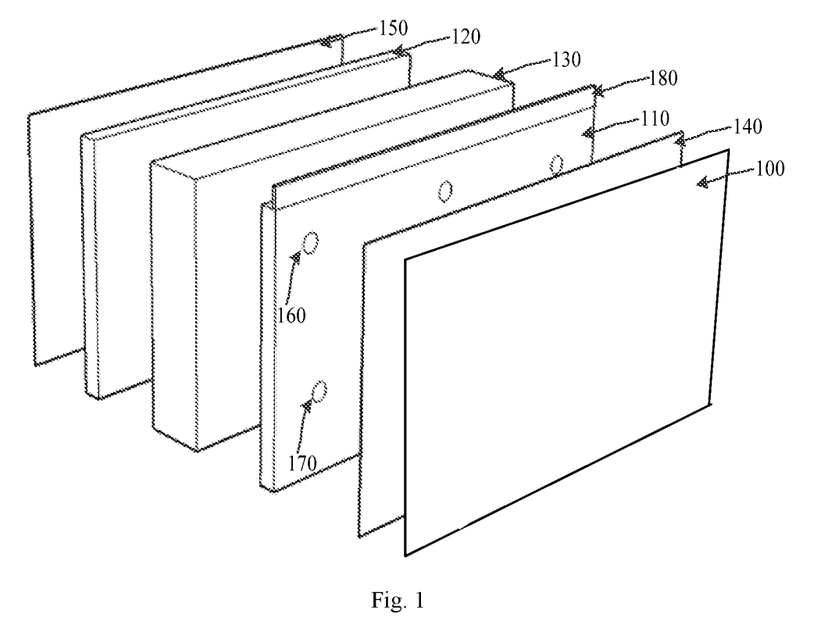
FIG. 1 is a block diagram showing a liquid crystal display (LCD) assembly according to an exemplary embodiment.

FIG. 1 is a structural schematic diagram of a liquid crystal display (LCD) assembly according to an exemplary embodiment.

As shown in FIG. 1, the liquid crystal display (LCD) assembly includes a touch screen 100, an upper substrate 110 disposed parallel to the touch screen 100, a lower substrate 120 disposed parallel to the upper substrate 110, a liquid crystal layer 130 enclosed between the upper substrate 110 and the lower substrate 120, an upper polarizer 140 attached to a side of the upper substrate 110 not adjacent to the liquid crystal layer 130, and a lower polarizer 150 attached to a side of the lower substrate 120 not adjacent to the liquid crystal layer 130.

As shown in FIG. 1, the liquid crystal display (LCD) assembly further includes at least one fingerprint identification sensor 160, at least one light sensor 170 and a control chip 180. Note that the control chip 180 may be an independent component that is separated from the substrates in the LCD assembly.

The at least one fingerprint identification sensor 160 is disposed between the upper polarizer 140 and the lower polarizer 150, and each of the at least one fingerprint identification sensor 160 is electrically connected to the control chip 180.

The at least one light sensor 170 is disposed between the upper polarizer 140 and the lower polarizer 150 or the at least one light sensor 170 is disposed on the touch screen 100, and each of the at least one light sensor 170 is electrically connected to the control chip 180.

To sum up, the liquid crystal display assembly provided by the present disclosure may select some of the at least one fingerprint identification sensor with the assistance of the at least one light sensor for carrying out fingerprint identification, by disposing the at least one fingerprint identification sensor between the upper polarizer and the lower polarizer and disposing the at least one light sensor between the upper polarizer and the lower polarizer or on the touch screen. As such, the problem of wasting resources caused by controlling all fingerprint identification sensors on the whole liquid crystal display (LCD) screen to carry out fingerprint identification is solved, and the effect of saving resources is achieved.

Figure 2A:
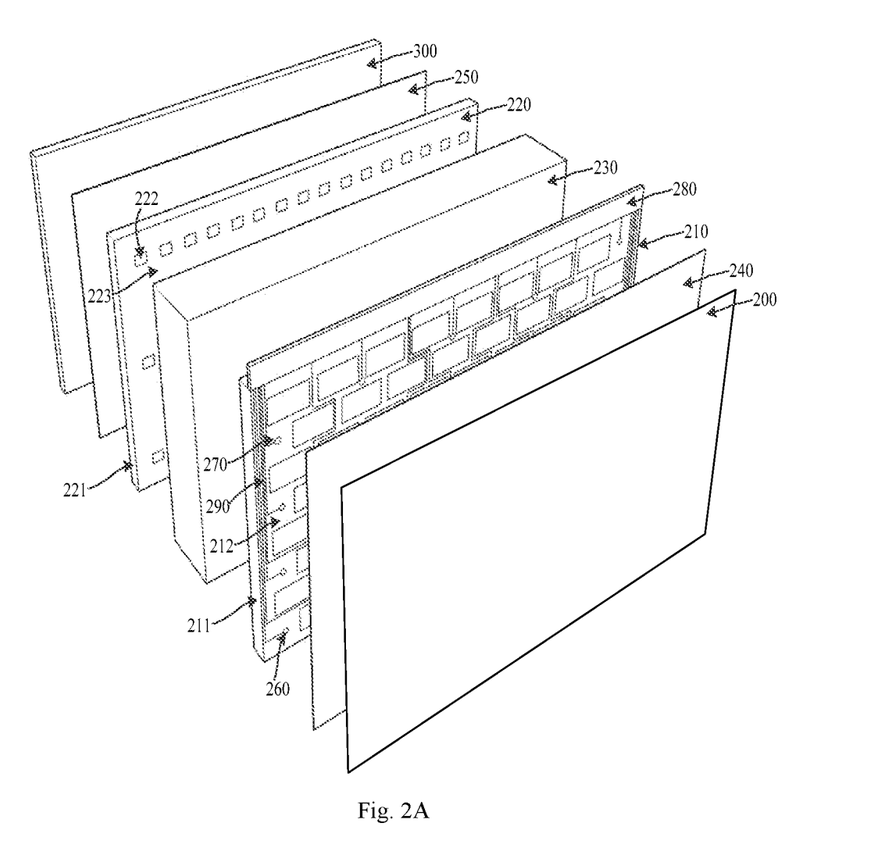
FIG. 2A is a block diagram showing a liquid crystal display (LCD) assembly according to an exemplary embodiment.

FIG. 2A is a structural schematic drawing of a liquid crystal display (LCD) assembly according to another exemplary embodiment. This LCD assembly may be applied in electronic devices such as a mobile phone, a tablet computer, a notebook computer, a smart TV, and the like.

As shown in FIG. 2A, the liquid crystal display (LCD) assembly includes a touch screen 200, an upper substrate 210 disposed parallel to the touch screen 200, a lower substrate 220 disposed parallel to the upper substrate 210, a liquid crystal layer 230 enclosed between the upper substrate 210 and the lower substrate 220, an upper polarizer 240 attached to a side of the upper substrate 210 not adjacent to the liquid crystal layer 230, and a lower polarizer 250 attached to a side of the lower substrate 220 not adjacent to the liquid crystal layer 230.

Additionally or alternatively, as shown in FIG. 2A, the upper substrate 210 includes an upper glass substrate 211 and a color filter (CF) 212. A lower surface of the upper glass substrate 211 is adjacent to the liquid crystal layer 230, and the CF 212 is attached to an upper surface of the upper glass substrate 211. The CF 212 enables a LCD (Liquid Crystal Display) panel to present a color image, and is arranged with several different pixel color blocks corresponding to three colors of R, G, B.

Figure 3:
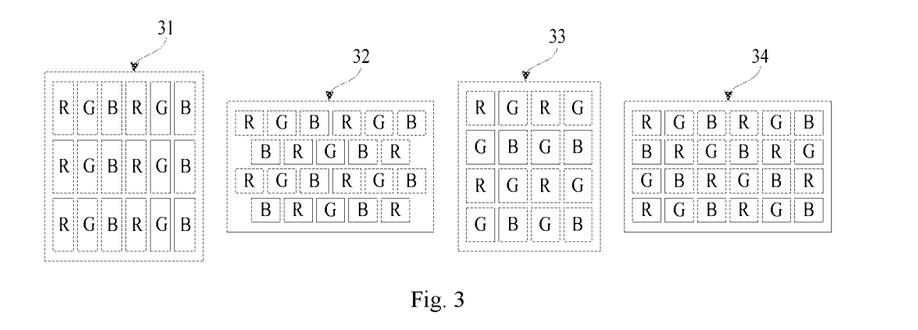
FIG. 3 is a schematic diagram showing different arrangements of pixel color blocks on a color filter (CF) according to an exemplary embodiment.

In FIG. 3, several different arrangements of pixel color blocks on the CF are illustrated. In a first possible arrangement, on CF 31 as shown, different pixel color blocks corresponding to three colors of R, G, B are arranged in a strip. In a second possible arrangement, on CF 32 as shown, different pixel color blocks corresponding to three colors of R, G, B are arranged in a triangle. In a third possible arrangement, on CF 33 as shown, different pixel color blocks corresponding to three colors of R, G, B are arranged in a square. In a fourth possible arrangement, on CF 34 as shown, different pixel color blocks corresponding to three colors of R, G, B are arranged in a mosaic (also referred to as "being diagonally arranged"). Of course, several arrangements shown in FIG. 3 are exemplary and explanatory only, and there are other possible arrangements not limited by the embodiment.

Figure 4:
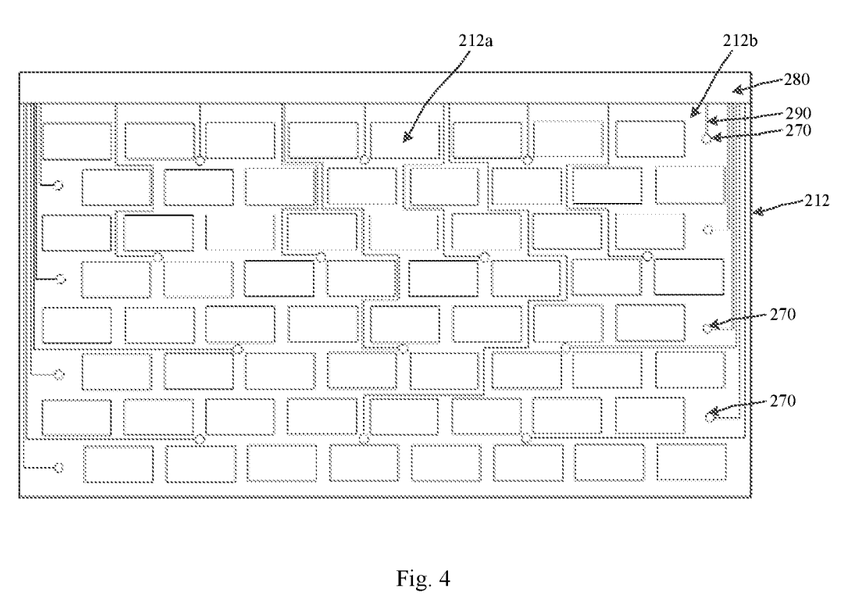
FIG. 4 is a side view of a CF according to an exemplary embodiment.

Additionally or alternatively, reference is made to FIGS. 2 and 4, the latter of which is a side view of the CF 212. The CF 212 includes pixel color blocks 212a and a first black matrix 212b arranged between the pixel color blocks 212a, which are different pixel color blocks corresponding to three colors of R, G, B. The first black matrix 212b is arranged between the pixel color blocks 212a. The first black matrix 212b prevents background light from leaking, improves display contrast of the LCD panel, prevents color mixture and increases color purity.

Additionally or alternatively, as shown in FIG. 2A, the lower substrate 220 includes a lower glass substrate 221 and a TFT array 222. An upper surface of the lower glass substrate 221 is adjacent to the liquid crystal layer 230, an upper surface of the lower glass substrate 221 is provided with the TFT array 222 and a second black matrix 223 arranged between TFTs of the TFT array 222.

Figure 5:
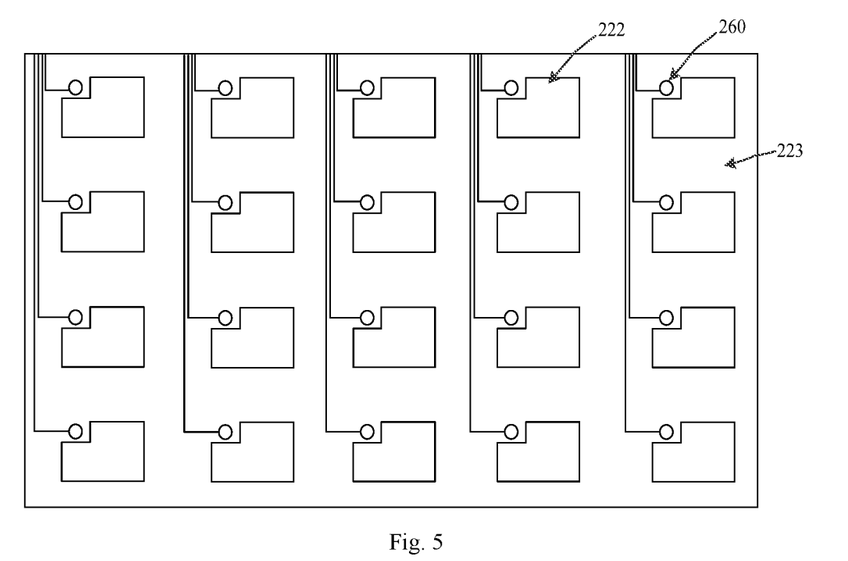
FIG. 5 is a side view of a lower glass substrate according to an exemplary embodiment.

FIG. 5 shows a side view of the lower glass substrate 221. The second black matrix 223 prevents background light from leaking, improves display contrast of the LCD panel, prevents color mixture, and increases color purity.

Figure 2B:
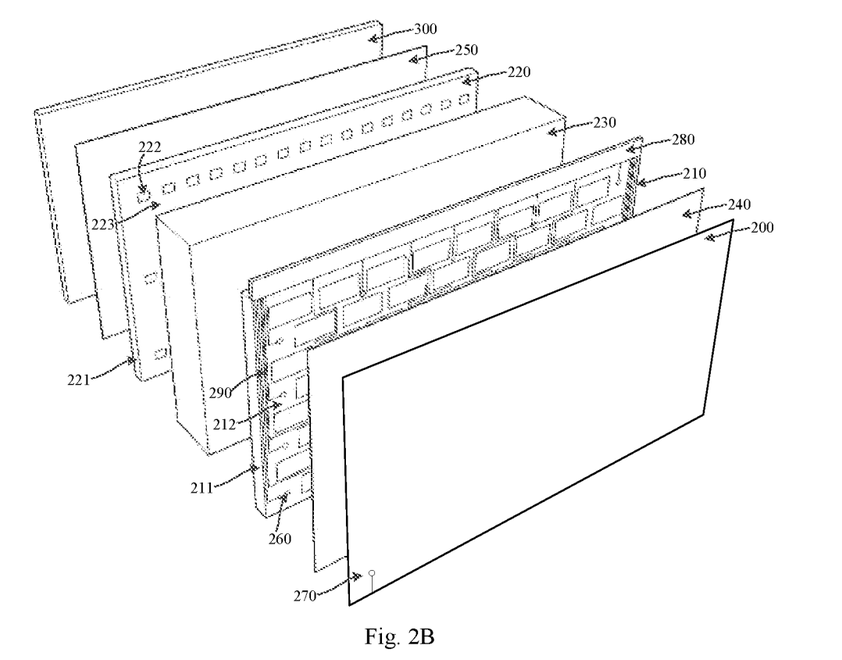
FIG. 2B is a block diagram showing a liquid crystal display (LCD) assembly according to an exemplary embodiment.

As shown in FIG. 2A, the liquid crystal display (LCD) assembly further includes at least one fingerprint identification sensor 260, at least one light sensor 270, and a control chip 280. The at least one fingerprint identification sensor 260 is disposed between the upper polarizer 240 and the lower polarizer 250, where each of the fingerprint identification sensors 260 is electrically connected to the control chip 280. The at least one light sensor 270 is disposed between the upper polarizer 240 and the lower polarizer 250, and each of the light sensors 270 is electrically connected to the control chip 280. Alternatively or additionally, the at least one light sensor 270 may be disposed on the touch screen 200 as shown in FIG. 2B.

In the following, arrangements of the fingerprint identification sensors 260 and light sensors 270 will be described.

Firstly, arrangements of the fingerprint identification sensors 260 will be described.

As an example, the fingerprint identification sensors 260 can be disposed on the upper surface of the lower glass substrate 221. As another example, the fingerprint identification sensors 260 can also be disposed on a side of the liquid crystal layer 230 which is adjacent to the upper glass substrate 211. As yet another example, the fingerprint identification sensors 260 can also be disposed on the CF 212, and so on.

Figure 6:
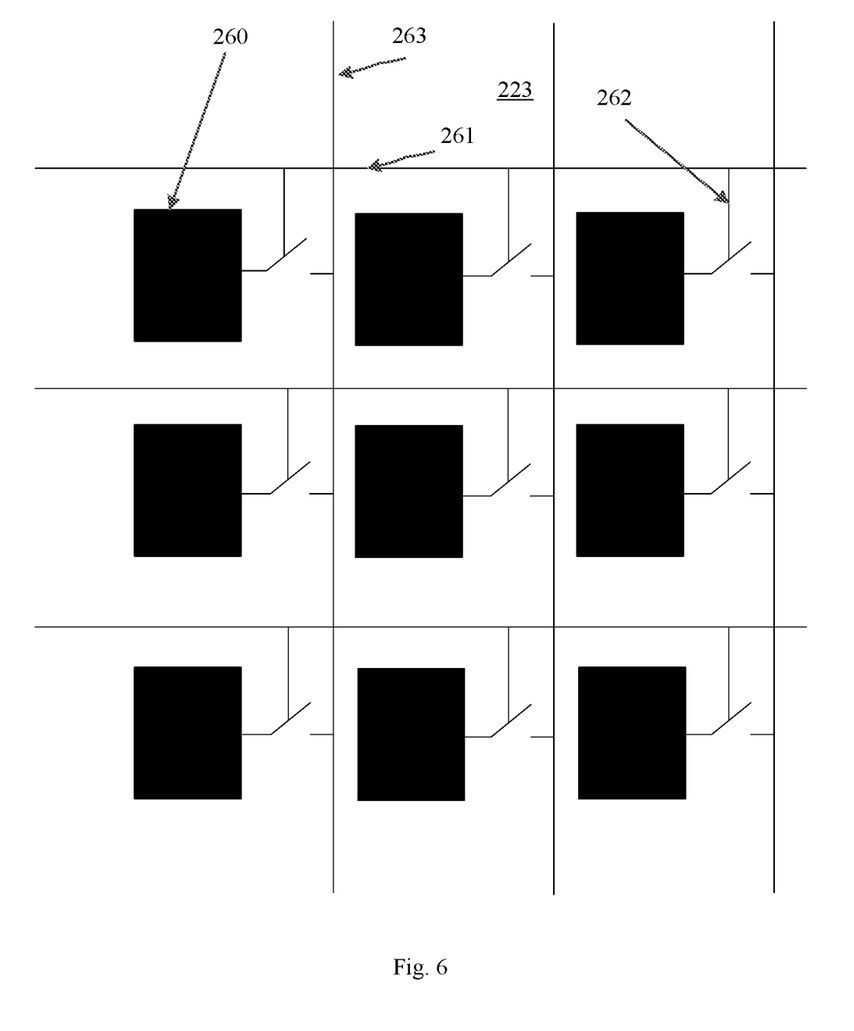
FIG. 6 is a schematic diagram showing a first arrangement of fingerprint identification sensors according to an exemplary embodiment.

FIG. 6 is a schematic diagram of a first arrangement of the fingerprint identification sensors 260. As illustrated, each of the fingerprint identification sensors 260 is electrically connected to the control chip 280 through a corresponding enabling line 261, and each of the fingerprint identification sensors 260 is electrically connected to a data line 263 through a switch 262. The data line 263 is used for transmission of collected fingerprint data. In the figure, a black rectangle represents a fingerprint identification sensor 260, a transverse line represents an enabling line 261, and a vertical line represents a data line 263.

In initialization, all of the fingerprint identification sensors 260 are controlled to be in an idle state, waiting for scan instructions. That is, an enabling terminal of each of the fingerprint identification sensors 260 is electrically connected to a corresponding enabling line 261. Whether the fingerprint identification sensor 260 is electrically connected to the data line 263 is controlled by a signal transmitted on the enabling line 261. In the figure, each of the fingerprint identification sensors 260 is connected to the corresponding enabling line 261 through a switch 262, and not connected to the data line 263.

In this embodiment, when the control chip 280 controls the switch 262 of a fingerprint identification sensor 260 to be in a first state by an enabling line 261, the fingerprint identification sensor 260 is in an idle state; and when the control chip 280 controls the switch 262 of the fingerprint identification sensor 260 to be in a second state by the enabling line 261, the fingerprint identification sensor 260 is in an operational state. The first state is an open state, and the second state is a closed state. Alternatively, the first state is the closed state, and the second state is the open state. This is not limited by the embodiment.

Figure 7:
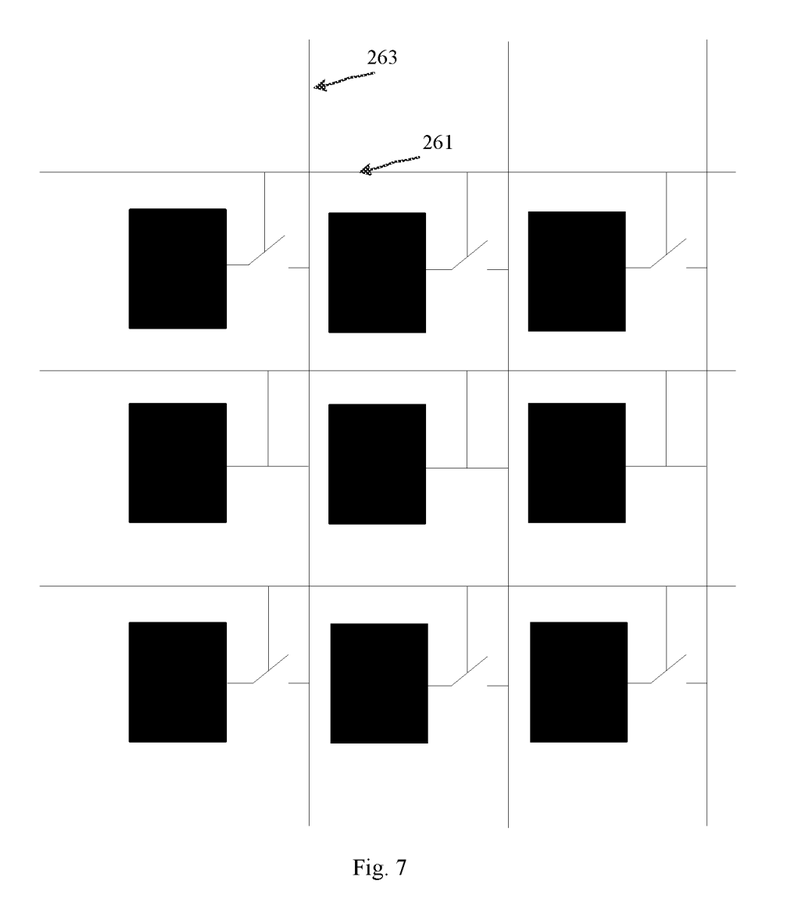
FIG. 7 is a schematic diagram showing a second arrangement of fingerprint identification sensors according to an exemplary embodiment.

FIG. 7 shows a schematic diagram of a second arrangement of the fingerprint identification sensors 260. Assuming that an electronic device needs to control a second row of the fingerprint identification sensors 260 to perform fingerprint identification, the fingerprint identification sensors 260 in the second row may be controlled to be electrically connected to data lines 263 by transmitting signals on the enabling line 261.

After the fingerprint identification sensors 260 are electrically connected to the data lines 263, the electronic device controls those fingerprint identification sensors 260 to perform scanning through scan instructions to obtain fingerprint data and transmits the fingerprint data via the data line 263, so as to perform a fingerprint identification process. When the fingerprint identification sensors 260 are capacitive fingerprint identification sensors, the fingerprint data may indicate capacitive values from the capacitive fingerprint identification sensors.

Additionally or alternatively, when the fingerprint identification sensors 260 are plural in number, e.g., when the number of the fingerprint identification sensors 260 is m (m≥2), the n fingerprint identification sensors 260 are uniformly and dispersedly arranged. For instance, in FIG. 6, the fingerprint identification sensors 260 are uniformly and dispersedly arranged on the lower glass substrate 221. By disposing a plurality of fingerprint identification sensors 260 and uniformly and dispersedly arranging the plurality of fingerprint identification sensors 260, failure in fingerprint identification caused by no fingerprint identification sensor being arranged in a position where the user's finger operates can be avoided. Thus, the success possibility of fingerprint identification is increased.

In one possible implementation, as shown in FIG. 5, the fingerprint identification sensors 260 are disposed on the second black matrix 223 of the lower glass substrate 221. Alternatively, the fingerprint identification sensors 260 are disposed on the first black matrix 212b on the CF 212. For instance, when the light sensors 270 are plural in number, the light sensors 270 are uniformly and dispersedly arranged on the second black matrix 223. Alternatively, the light sensors 270 are uniformly and dispersedly arranged on the first black matrix 212b. By disposing the fingerprint identification sensors 260 on the second black matrix 223 or the first black matrix 212b, it can be ensured that arrangement of the fingerprint identification sensors 260 does not affect light transmittance of the LCD panel and hence that display effect of the LCD panel is not affected.

Additionally or alternatively, referring to FIGS. 6 and 7, enabling lines 261 and data lines 263 are disposed on the second black matrix 223. By disposing the enabling lines 261 and the data lines 263 on the second black matrix 223, it can be ensured that arrangement of the enabling lines 261 and the data lines 263 does not affect light transmittance of the LCD panel and hence that display effect of the LCD panel is not affected. Additionally or alternatively, a conducting wire 290 may also be made of a transparent material.

Secondly, arrangements of the light sensors 270 will be described.

As an example, the light sensors 270 can be disposed on an upper surface of the lower glass substrate 221. As another example, the light sensors 270 can also be disposed on a side of the liquid crystal layer 230 which is adjacent to the upper glass substrate 211. As yet another example, the light sensors 270 can also be disposed on the CF 212, and so on. Each of the light sensors 270 is electrically connected to the control chip 280. After converting optical signals into electrical signals, the light sensors 270 provide the electrical signals to the control chip 280.

Additionally or alternatively, when the light sensors 270 are plural in number, e.g., when the number of the light sensors 270 is n (n≥2), the m light sensors 270 are uniformly and dispersedly arranged. For instance, in FIG. 4, the light sensors 270 are uniformly and dispersedly arranged on the CF 212. Alternatively, the light sensors 270 are uniformly and dispersedly arranged on the second black matrix 223 of the lower glass substrate 221. By disposing a plurality of light sensors 270 and uniformly and dispersedly arranging the plurality of light sensors 270, it is possible to prevent all of the light sensors 270 from being completely blocked by the user's finger or another object due to the user's operation on the LCD panel. As such, even when some of the light sensors 270 are blocked, the others of the light sensors 270 are still not blocked and still can collect accurate sensor data. Further, by disposing the light sensors 270 on the second black matrix 223 or the first black matrix 212b, it can be ensured that arrangement of the light sensors 270 does not affect light transmittance of the LCD panel and hence that display effect of the LCD panel is not affected.

Additionally or alternatively, referring to FIG. 4, each of the light sensors 270 is electrically connected to the control chip 280 via a conducting wire, and conducting wires 290 are also disposed on the first black matrix 212b of CF 212. By disposing the conducting wires 290 also on the first black matrix 212b, it can be ensured that arrangement of the conducting wires 290 does not affect light transmittance of the LCD panel and hence that display effect of the LCD panel is not affected. Additionally or alternatively, the conducting wires 290 may also be made of a transparent material.

Additionally or alternatively, the light sensors 270 can also be uniformly and dispersedly arranged on the touch screen 100.

In addition, each of the light sensors 270 includes a photosensitive element disposed at the same side as the upper polarizer 240 to ensure normal reception of optical signals. The photosensitive element includes but is not limited to any one of the following: a photoresistor, photodiode, phototriode, and silicon photocell. The photosensitive elements are used to convert optical signals into electrical signals. Additionally or alternatively, the photosensitive elements can be made of a transparent material.

As shown in FIG. 2A, the liquid crystal display (LCD) assembly may further include at least one backlight 300 electrically connected to the control chip 280. The backlight 300 is disposed at the back side of the lower polarizer 250. The backlight 300 is used for providing a light source behind the LCD panel. The type of the backlight 300 includes but is not limited to any of EL (Electro Luminescent), CCFL (Cold Cathode Fluorescent Lamp), LED (Light Emitting Diode) and the like.

In addition, the control chip 280 can be a MCU (Microcontroller Unit), which is also referred to as single-chip microcomputer or microcontroller and is a chip-level computer. In one possible implementation, taking an example where a MCU dynamically adjusts a backlight luminance according to ambient light brightnesses, each of the light sensors 270 collects an ambient light brightness, and the MCU acquires ambient light brightnesses from the light sensors 270, conducts computation processing of the acquired ambient light brightnesses, and determines the backlight luminance depending upon the computation result, and then controls light emission of the backlight 300 depending upon the determined backlight luminance. For example, when the ambient light brightnesses are higher, light emitting luminance of the backlight 300 is also controlled to be higher; and when the ambient light brightnesses are lower, light emitting luminance of the backlight 300 is also controlled to be lower.

In addition, a display region corresponding to the LCD assembly can be a complete display region that is correspondingly provided with at least one backlight 300. The at least one backlight 300 is used to control a backlight luminance of the entire display region.

Figure 8:
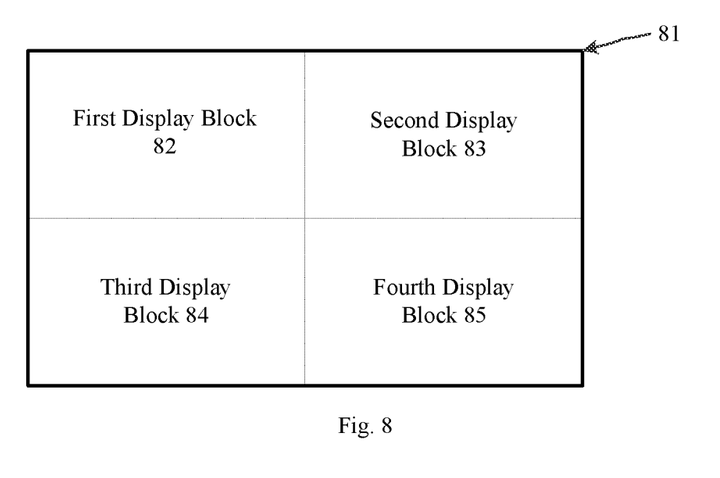
FIG. 8 is a schematic diagram showing a display region corresponding to the LCD assembly according to an exemplary embodiment.

Alternatively, as shown in FIG. 8, a display region 81 corresponding to the LCD assembly is optionally divided into k (k≥2) display blocks (including a first display block 82, a second display block 83, a third display block 84 and a fourth display block 85 as shown). Each of the display blocks is correspondingly provided with at least one backlight 300, and each of the display blocks is correspondingly provided with at least one light sensor 270 and at least one fingerprint identification sensor 260. For each display block, a number of backlights 300 corresponding thereto are used to solely control a backlight luminance of the display region. For instance, assuming that the first display block 82 is correspondingly provided with a first backlight and a first light sensor and that the second display block 83 is correspondingly provided with a second backlight and a second light sensor, then the first backlight is used to solely control a backlight luminance of the first display block 82 according to the ambient light brightness collected by the first light sensor, and the second backlight is used to solely control a backlight luminance of the second display block 83 according to the ambient light brightness collected by the second light sensor. By dividing the display region corresponding to the LCD assembly into a plurality of display blocks and utilizing different backlights to control backlight luminances of the plurality of display blocks respectively, flexibility of backlight control is improved.

To sum up, the liquid crystal display (LCD) assembly provided by the present disclosure can select some of the at least one fingerprint identification sensor with the assistance of the at least one light sensor for carrying out fingerprint identification, by disposing the at least one fingerprint identification sensor between the upper polarizer and the lower polarizer and disposing the at least one light sensor between the upper polarizer and the lower polarizer or on the touch screen. As such, the problem of wasting resources caused by controlling all fingerprint identification sensors on the whole liquid crystal display (LCD) screen to carry out fingerprint identification is solved, and the effect of saving resources is achieved.

In addition, by disposing the fingerprint identification sensors and the light sensors on the first black matrix of the CF or disposing the fingerprint identification sensors and the light sensors on the second black matrix provided on the lower substrate, it is ensured that arrangement of the fingerprint identification sensors and the light sensors does not affect light transmittance of the LCD panel and hence that display effect of the LCD panel is not affected.

In addition, by disposing a plurality of fingerprint identification sensors and uniformly and dispersedly arranging the plurality of fingerprint identification sensors, failure in fingerprint identification caused by no fingerprint identification sensor arranged in a position where the user's finger operates can be avoided, and the success possibility of fingerprint identification can be increased.

In addition, by disposing a plurality of light sensors and uniformly and dispersedly arranging the plurality of light sensors, it is possible to prevent all of the light sensors from being completely blocked by the user's finger or another object due to the user's operation on the LCD panel. As such, even when some of the light sensors are blocked, the others of the light sensors are still not blocked and still can collect accurate sensor data.

According to another embodiment of this disclosure, there is further provided an electronic device. For example, the electronic device may be a mobile phone, a computer, a digital broadcast terminal, a messaging device, a gaming console, a tablet, a medical device, exercise equipment, a personal digital assistant or the like. The electronic device includes the LCD assembly provided by the above embodiment as shown in FIG. 1 or 2.

Those skilled in the art may easily conceive other embodiments of the disclosure from consideration of the specification and practice of the present disclosure. This application is intended to cover any variations, uses, or adaptations of the disclosure following the general principles thereof and including such departures from the present disclosure as come within known or customary practice in the art. The specification and examples are intended to be exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A liquid crystal display (LCD) assembly, comprising:
a touch screen, an upper substrate disposed parallel to the touch screen, a lower substrate disposed parallel to the upper substrate, a liquid crystal layer enclosed between the upper substrate and the lower substrate, an upper polarizer attached to a side of the upper substrate not adjacent to the liquid crystal layer, and a lower polarizer attached to a side of the lower substrate not adjacent to the liquid crystal layer; and
at least one fingerprint identification sensor, at least one light sensor and a control chip, wherein the at least one fingerprint identification sensor is disposed between the upper polarizer and the lower polarizer, and each of the at least one fingerprint identification sensor is electrically connected to the control chip;
wherein the at least one light sensor is disposed between the upper polarizer and the lower polarizer, and each of the at least one light sensor is electrically connected to the control chip;
wherein the liquid crystal display assembly is configured to select some of the at least one fingerprint identification sensor with the assistance of the at least one light sensor for carrying out fingerprint identification;
wherein the lower substrate comprises a lower glass substrate and a Thin Film Transistor (TFT) array;
wherein the at least one light sensor is disposed on an upper surface of the lower glass substrate;
wherein an upper surface of the lower glass substrate is adjacent to the liquid crystal layer; and
wherein a lower surface of the lower glass substrate is provided with the TFT array and a second black matrix arranged between TFTs of the TFT array.

2. The LCD assembly according to claim 1, wherein each of the at least one fingerprint identification sensor is electrically connected to the control chip through a corresponding enabling line, and each of the at least one fingerprint identification sensor is electrically connected to a data line through a switch.

3. The LCD assembly according to claim 1, wherein when the control chip controls the switch of the fingerprint identification sensor to be in a first state by an enabling line, the fingerprint identification sensor is in an idle state; and
wherein when the control chip controls the switch of the fingerprint identification sensor to be in a second state by the enabling line, the fingerprint identification sensor is in an operational state.

4. The LCD assembly according to claim 1, wherein each of the at least one light sensor is electrically connected to the control chip by a conducting wire.

5. The LCD assembly according to claim 1, wherein the upper substrate comprises an upper glass substrate and a color filter (CF);
wherein a lower surface of the upper glass substrate is adjacent to the liquid crystal layer;
wherein the CF is attached to an upper surface of the upper glass substrate; and
wherein the CF comprises pixel color blocks and a first black matrix arranged between the pixel color blocks.

6. The LCD assembly according to claim 5, wherein at least one of the at least one light sensor and the at least one fingerprint identification sensor is disposed on the first black matrix.

7. The LCD assembly according to claim 1, wherein at least one of the at least one light sensor and the at least one fingerprint identification sensor is disposed on the second black matrix.

8. The LCD assembly according to claim 1, wherein the number of the at least one light sensor is n, and the n light sensors are uniformly and dispersedly arranged, wherein $n \geq 2$; and
wherein the number of the at least one fingerprint identification sensor is m, and the m fingerprint identification sensors are uniformly and dispersedly arranged, wherein $m \geq 2$.

9. The LCD assembly according to claim 1, wherein the LCD assembly further comprises at least one backlight; and
wherein the at least one backlight is electrically connected to the control chip.

10. The LCD assembly according to claim 9, wherein
a display region corresponding to the LCD assembly is divided into a plurality of display blocks, each display block is correspondingly provided with at least one backlight, and each display block is correspondingly provided with at least one light sensor and at least one fingerprint identification sensor.

11. An electronic device, comprising a liquid crystal display (LCD) that comprises:
a touch screen, an upper substrate disposed parallel to the touch screen, a lower substrate disposed parallel to the upper substrate, a liquid crystal layer enclosed between the upper substrate and the lower substrate, an upper polarizer attached to a side of the upper substrate not adjacent to the liquid crystal layer, and a lower polarizer attached to a side of the lower substrate not adjacent to the liquid crystal layer; and
at least one fingerprint identification sensor, at least one light sensor and a control chip;
wherein the at least one fingerprint identification sensor is disposed between the upper polarizer and the lower polarizer, and each of the at least one fingerprint identification sensor is electrically connected to the control chip,
wherein the at least one light sensor is disposed on the touch screen, and each of the at least one light sensor is electrically connected to the control chip,
wherein the liquid crystal display is configured to select some of the at least one fingerprint identification sensor with the assistance of the at least one light sensor for carrying out fingerprint identification;
wherein the lower substrate comprises a lower glass substrate and a Thin Film Transistor (TFT) array;
wherein the at least one light sensor is disposed on an upper surface of the lower glass substrate;
wherein an upper surface of the lower glass substrate is adjacent to the liquid crystal layer; and wherein a lower surface of the lower glass substrate is provided with the TFT array and a second black matrix arranged between TFTs of the TFT array.

12. The electronic device of claim 11, wherein each of the at least one fingerprint identification sensor is electrically connected to the control chip through a corresponding enabling line, and each of the at least one fingerprint identification sensor is electrically connected to a data line through a switch.

13. The electronic device of claim 11, wherein when the control chip controls the switch of the fingerprint identification sensor to be in a first state by an enabling line, the fingerprint identification sensor is in an idle state; and wherein when the control chip controls the switch of the fingerprint identification sensor to be in a second state by the enabling line, the fingerprint identification sensor is in an operational state.

14. The electronic device of claim 11, wherein each of the at least one light sensor is electrically connected to the control chip by a conducting wire.

15. The electronic device of claim 11, wherein the upper substrate comprises an upper glass substrate and a color filter (CF);

wherein a lower surface of the upper glass substrate is adjacent to the liquid crystal layer;

wherein the CF is attached to an upper surface of the upper glass substrate; and wherein the CF comprises pixel color blocks and a first black matrix arranged between the pixel color blocks.

16. The electronic device of claim 15, wherein at least one of the at least one light sensor and the at least one fingerprint identification sensor is disposed on the first black matrix.

17. The electronic device of claim 11, wherein at least one of the at least one light sensor and the at least one fingerprint identification sensor is disposed on the second black matrix.

18. The electronic device of claim 11, wherein the number of the at least one light sensor is n, and the n light sensors are uniformly and dispersedly arranged, wherein $n \geq 2$; and wherein the number of the at least one fingerprint identification sensor is m, and the m fingerprint identification sensors are uniformly and dispersedly arranged, wherein $m \geq 2$.

* * * * *